United States Patent
Grunau et al.

(10) Patent No.: US 7,686,717 B2
(45) Date of Patent: Mar. 30, 2010

(54) HYDRAULIC TENSIONER

(75) Inventors: Arbogast Grunau, Weisendorf (DE);
Thomas Bertelshofer, Ebermannstadt (DE); Eduard Kratz, Höchstadt (DE);
Christian Schäfer, Nürnberg (DE);
Harald Schäfer, Nürnberg (DE);
Dietmar Jäger, Langenzenn (DE);
Marco Orsi, Middlesex (GB)

(73) Assignee: INA-Schaeffler KG, Herzogenaurach (DE)

( * ) Notice: Subject to any disclaimer, the term of this patent is extended or adjusted under 35 U.S.C. 154(b) by 1068 days.

(21) Appl. No.: 10/995,959

(22) Filed: Nov. 23, 2004

(65) Prior Publication Data

US 2005/0130777 A1    Jun. 16, 2005

Related U.S. Application Data

(63) Continuation of application No. PCT/EP03/05288, filed on May 20, 2003.

(30) Foreign Application Priority Data

May 23, 2002  (DE) ................................. 102 22 752

(51) Int. Cl.
*F16H 7/08* (2006.01)
*F16H 7/22* (2006.01)

(52) U.S. Cl. ....................... 474/110; 474/109

(58) Field of Classification Search ......... 474/109–110, 474/117, 112, 136, 138; 123/90.15, 90.37, 123/90.38; 74/18, 18.1, 18.2
See application file for complete search history.

(56) References Cited

U.S. PATENT DOCUMENTS

| | | | | |
|---|---|---|---|---|
| 4,190,025 A | * | 2/1980 | Wahl | 123/90.31 |
| 4,790,801 A | | 12/1988 | Schmidt et al. | |
| 4,792,322 A | * | 12/1988 | Goppelt et al. | 474/136 |
| 4,850,941 A | * | 7/1989 | Sosson | 474/110 |
| 4,976,660 A | * | 12/1990 | Breindl | 474/135 |
| 4,997,410 A | * | 3/1991 | Polster et al. | 474/110 |
| 5,480,358 A | * | 1/1996 | Sakai et al. | 474/117 |
| 5,967,923 A | * | 10/1999 | Petri | 474/138 |
| 6,106,424 A | * | 8/2000 | Kratz | 474/110 |
| 6,196,939 B1 | * | 3/2001 | Simpson | 474/110 |
| 6,634,973 B1 | * | 10/2003 | Simpson et al. | 474/109 |
| 2001/0016530 A1 | * | 8/2001 | Grunke et al. | 474/110 |

FOREIGN PATENT DOCUMENTS

| | | |
|---|---|---|
| DE | 41 24 500 A1 | 1/1993 |
| DE | 195 39 616 A1 | 4/1997 |
| DE | 196 53 066 A | 7/1997 |

(Continued)

*Primary Examiner*—Marcus Charles
(74) *Attorney, Agent, or Firm*—Henry M. Feiereisen; Ursula B. Day

(57) ABSTRACT

A tensioner for a traction drive includes a cylinder arranged in a housing at a distance to a housing wall to thereby define an interior space which contains hydraulic fluid. A piston is received in the cylinder for back-and-forth movement and bounds a pressure chamber containing hydraulic fluid. The piston has a cylinder-distal end which is operatively connected to a spring-biased tension roller supported on a traction member. Formed between the piston and the cylinder is a leakage gap, and a reservoir for hydraulic fluid is provided in an area of the leakage gap to prevent ingress of air into the pressure chamber, when the traction drive is at a rest.

24 Claims, 4 Drawing Sheets

FOREIGN PATENT DOCUMENTS

| | | | |
|---|---|---|---|
| DE | 196 09 420 A1 | | 9/1997 |
| DE | 198 28 309 A | | 12/1999 |
| DE | 10155364 A1 | * | 5/2003 |
| EP | 0483564 A1 | * | 5/1992 |
| EP | 0 718 525 A | | 6/1996 |
| FR | 2 803 005 A | | 6/2001 |
| JP | 2001 221306 A | | 8/2001 |
| WO | WO 92/14039 A1 | * | 8/1992 |

* cited by examiner

HYDRAULIC TENSIONER

CROSS-REFERENCES TO RELATED APPLICATIONS

This application is a continuation of prior filed copending PCT International application No. PCT/EP03/05288, filed May 20, 2003, which designated the United States and on which priority is claimed under 35 U.S.C. §120, the disclosure of which is hereby incorporated by reference, and which claims the priority of German Patent Application, Serial No. 102 22 752.7, filed May 23, 2002, pursuant to 35 U.S.C. 119(a)-(d).

BACKGROUND OF THE INVENTION

The present invention relates, in general, to a hydraulic-mechanical tensioner.

Nothing in the following discussion of the state of the art is to be construed as an admission of prior art.

German patent publication DE 41 24 500 A1 describes a hydraulic tensioner having a cylinder in which a piston is able to move back and forth and bounds a pressure chamber that contains hydraulic fluid. The pressure chamber is hereby separated from a circular-ring shaped interior space between the outer cylinder wall and an inner wall of an enclosing housing. The cylinder-distal end of the piston is connected indirectly to a tension roller supported on a traction member, such as a belt of the traction drive. Tensioners of this type are oftentimes used in traction drives of internal combustion engines for driving aggregates, such as water pump, steering pump, air-conditioner compressor or generator.

During operation, the tensioner heats up like other components of the internal combustion engine. When the internal combustion engine is at a rest, the components are able to cool down. In the case of the tensioner, the pressure chamber decreases hereby in volume during the cool-down phase so that hydraulic fluid and air is being drawn in completely from a leakage gap located between the piston and the cylinder resulting in so-called lost motion. Lost motion causes faulty operation of the tensioner because of the underpressure in the pressure chamber of the cylinder, when the internal combustion engine is at rest. The underpressure is insufficient to open the one-way valve but, rather, draws the contained hydraulic fluid in the leakage gap. Once the leakage gap is emptied, air migrates from the interior space of the housing via the leakage gap into the pressure space to trigger the afore-mentioned lost motion of the tensioner.

Thus, the presence of trapped air in the pressure chamber during operation of the internal combustion engine, has an adverse effect on the operation of the tensioner because compressible air does not permit a defined position of the tensioner and thus of the tension roller, so that the biasing force of the traction member is adversely impacted as the tension roller is not properly supported upon the traction member. In addition, noise develops and slippage of the traction member is experienced resulting in increased wear.

It would therefore be desirable and advantageous to provide an improved hydraulic tensioner to obviate prior art shortcomings and to operate reliably regardless of any temperature impacts.

SUMMARY OF THE INVENTION

According to one aspect of the present invention, a tensioner for a traction drive, includes a housing defining a longitudinal axis and having a housing wall, a cylinder arranged in the housing at a distance to the housing wall to thereby define an interior space in surrounding relationship to the cylinder and at least partially containing hydraulic fluid, a piston received in the cylinder for movement in direction of the longitudinal axis and bounding a pressure chamber containing hydraulic fluid, wherein the piston has a cylinder-distal end which is operatively connected to a spring-biased tension roller supported on a traction member, a leakage gap formed between the piston and the cylinder, a reservoir provided in an area of the leakage gap and containing hydraulic fluid to prevent ingress of air into the pressure chamber, when the traction drive is at a rest, and a one-way valve disposed between the pressure chamber and the interior space, wherein hydraulic fluid is able to flow from the interior space into the pressure chamber via the one-way valve, when the piston moves in one direction, and is able to escape from the pressure chamber via the leakage gap, when the piston moves in another direction.

The present invention resolves prior art problems by providing a reservoir for hydraulic fluid between the cylinder and the piston in the area of the leakage gap. In other words, a low-pressure zone is arranged anteriorly of the pressure chamber. The reservoir is sized and configured as to be able to compensate for any change in volume of the pressure chamber, even at extreme temperature differences between the operating mode and the idle mode of the tensioner. The provision of the reservoir prevents an emptying of the leakage gap during the cool-down phase of the tensioner, i.e. when the internal combustion engine is at rest and underpressure may develop in the pressure chamber of the cylinder, so that the occurrence of lost motion is eliminated.

According to another feature of the present invention, the reservoir can be constructed in the form of a circumferential groove which is formed in the inside wall surface of the cylinder. As an alternative, the reservoir may also be constructed in the form of at least one circumferential groove which is formed in the outer surface area of the piston in an area of the cylinder. Another variation involves the combination of a reservoir in the form of a groove in the cylinder, and a reservoir in the form of a groove in the piston.

According to another feature of the present invention, the reservoir may be configured in the form of a wavy groove. The wavy configuration of the reservoir simplifies the assembly of the tensioner because the piston can be pushed unimpededly axially into the cylinder. As an alternative, the reservoir may also be configured in the form of a helical groove, formed in the cylinder or the piston.

According to another feature of the present invention, a radially biased snap ring may be received in a groove of the piston for restricting a movement of the piston. The cylinder may hereby be formed with an internal shoulder which projects into a movement path of the snap ring to stop the movement of the piston. The reservoir in the form of a wavy or helical groove prevents an inadvertent locking of the snap ring.

Locking of the snap ring may also be avoided by forming the groove wall of the reservoir in the direction of the one-way valve with a circumferential chamfer or rounded transition zone. Thus, when inserting the piston into the cylinder, the radially biased snap ring may snap back into the reservoir but is automatically forced radially inwardly out of the reservoir, when the piston is pushed further into the cylinder.

According to another feature of the present invention, the reservoir may be realized by plural axially stepped reservoir spaces formed in the cylinder and/or the outer surface area of the piston. When the provision of a reservoir is desired to cover a large area, the use of a plurality of smaller reservoir spaces is preferred in order to maintain the integrity of the components.

According to another feature of the present invention, the reservoir may include a slanted or rounded transition zone between an end surface and the inside wall of the cylinder. The reservoir may also include a slanted run-on surface between the end surface of the cylinder and the inside wall surface of the cylinder, with the slanted run-on surface defining a chamfer of an angle of $\geq 10°$.

According to another feature of the present invention, the reservoir may be realized by forming at least one substantially radial or slanted bore in the piston. Such a reservoir does neither adversely affect the strength or integrity of the piston nor the assembly of the tensioner.

According to another feature of the present invention, the reservoir is situated at all times in the area of the leakage gap, regardless of a position of the piston inside the cylinder. This ensures a sufficient volume of hydraulic fluid in the leakage gap and effectively prevents an undesired lost motion.

According to another feature of the present invention, a separate collar or cylindrical shell may be attached to an end surface of the cylinder to define the reservoir in prolongation of the cylinder. The attachment of the collar may be realized in a form-fitting and/or force-fitting manner. The reservoir has a circular ring shaped configuration of relatively large volume and does neither adversely affect the strength or integrity of the piston and cylinder unit nor the assembly of the tensioner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
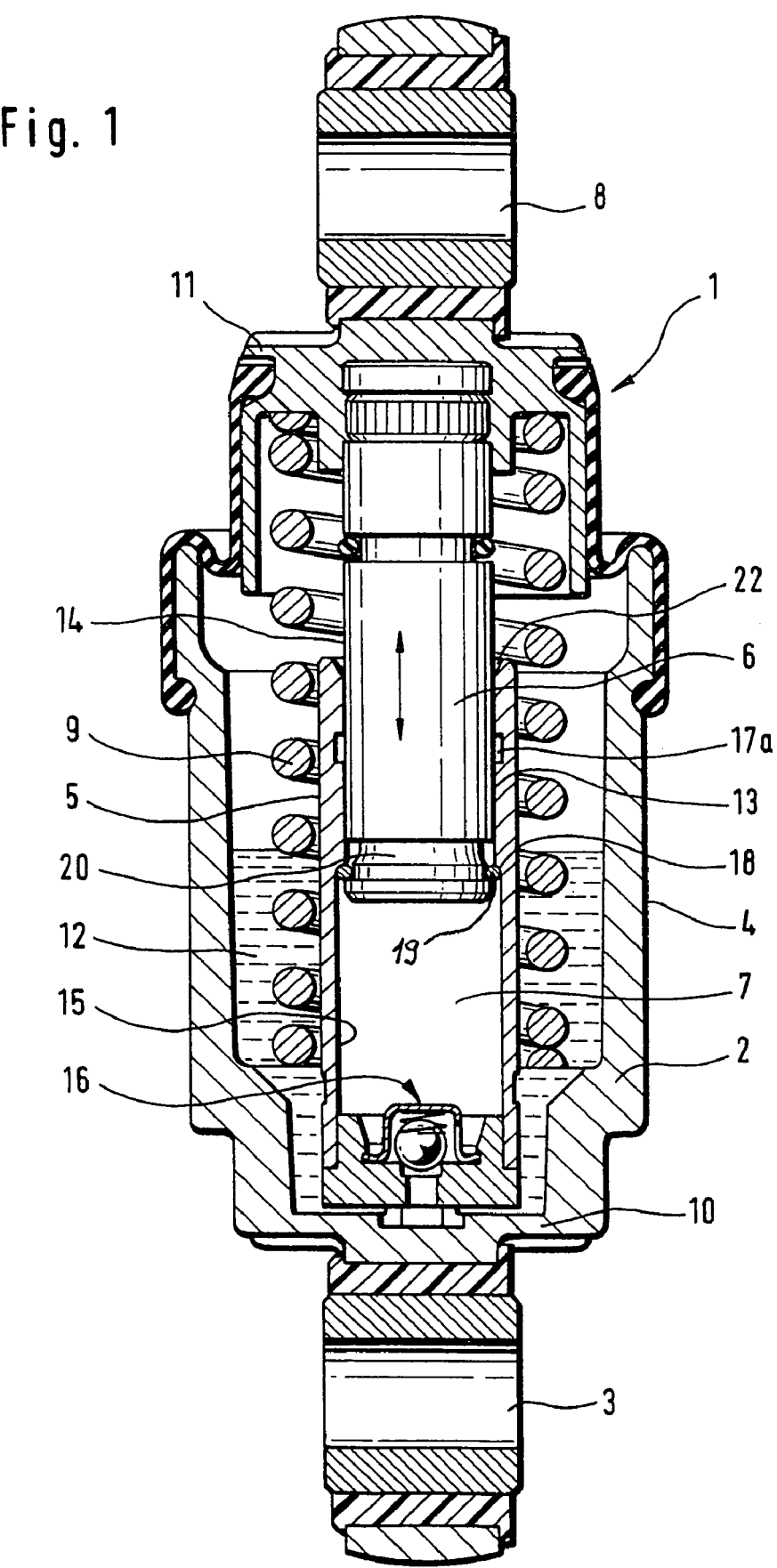
FIG. 1 is a longitudinal section of a first embodiment of a tensioner according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of a first embodiment of a hydraulic-mechanical tensioner according to the present invention, generally designated by reference numeral 1 and including a rotation-symmetric housing 2 of pot-shaped configuration. The housing 2 has one end connected to a fastening eye 3 which, for example, is swingably mounted to an internal combustion engine (not shown). Fitted centrally in the housing 2 radially inwards at a distance to an outer wall 4 of the housing 2 is a cylinder 5 which guides a piston 6 for longitudinal movement. A leakage gap 13 is defined between an outer surface area 14 of the piston 6 and an inside wall 15 of the cylinder 5. The piston 6 has one end surface to bound a pressure chamber 7 inside the cylinder 5 for hydraulic fluid, and another cylinder-distal end for connection to a fastening eye 8 which interacts directly or indirectly with a tension roller (not shown) for tensioning a traction member, e.g. a belt, of a traction drive. The force-locking engagement of the tension roller is realized by a helical compression spring 9 having one spring end supported by a bottom 10 of the housing 2, and an opposite spring end resting against a spring support 11 which is connected in one piece with the fastening eye 8 and the piston 6.

Disposed at the piston-confronting end of the cylinder 5 adjacent to the bottom 10 is a one-way valve 16 which is constructed to allow a flow of hydraulic fluid only in direction into the pressure chamber 7.

Defined between the cylinder 5 and the surrounding housing 2 is a circular ring shaped interior space 12 which contains hydraulic fluid in a lower region adjacent to the bottom 10. An adjusting movement by the piston 6 in a direction, indicated by the double arrow, results in a volume exchange between the pressure chamber 7 and the interior space 12. In other words, when the piston 6 moves in a direction toward the bottom 10, the pressure chamber 7 decreases in volume and hydraulic fluid escaped through the leakage gap 13. A movement of the piston 6 in opposite direction increases the volume of the pressure chamber 7 so that hydraulic fluid is drawn from the interior space 12 via the one-way valve 16 into the pressure chamber 7.

Provided in the area of the leakage gap 13 is a reservoir 17a which is realized by forming the inside wall 15 of the cylinder 5 with a circumferential annular groove. During operation of the tensioner 1, the reservoir 17a is filled with hydraulic fluid. When the tensioner 1 is idle, i.e. when the internal combustion engine is at rest and the tensioner 1 is able to cool down, underpressure is formed in the pressure chamber 7. This underpressure is insufficient to open the one-way valve 16 in order to draw in hydraulic fluid but is enough to draw hydraulic fluid from the leakage gap 13. The arrangement of the reservoir 17a prevents the leakage gap 13 from being drained empty and prevents air from being sucked into the pressure chamber 7, even when the tensioner 1 is used under extreme temperatures. In other words, hydraulic fluid contained in the reservoir 17a is able to effectively compensate a hydraulic fluid need in the pressure chamber 7 as a result of temperature impacts.

The cylinder 5 is further formed with a shoulder 18 for limiting a movement of the piston 6 in upward direction in conjunction with a radially biased snap ring 19 received in an annular groove 20 of the piston 6. The term "upward" will denote here a direction away from the one-way valve 16 in FIG. 1. When the tensioner 1 is assembled, the snap ring 19 abuts against the shoulder 18. The upper end of the cylinder 5 is formed with a slanted run-on surface 22 which facilitates assembly of the tensioner 1, when the piston 6 is pushed into the cylinder 5 from this side, and forces the snap ring 19 radially inwards into the annular groove 20. Suitably, the run-on surface 22 extends at an angle of ≧10°. After passing the shoulder 18, the snap ring 19 automatically snaps back in radial direction to ensure a secure stop for limiting the movement of the piston 6 in upward direction.

Figure 2:
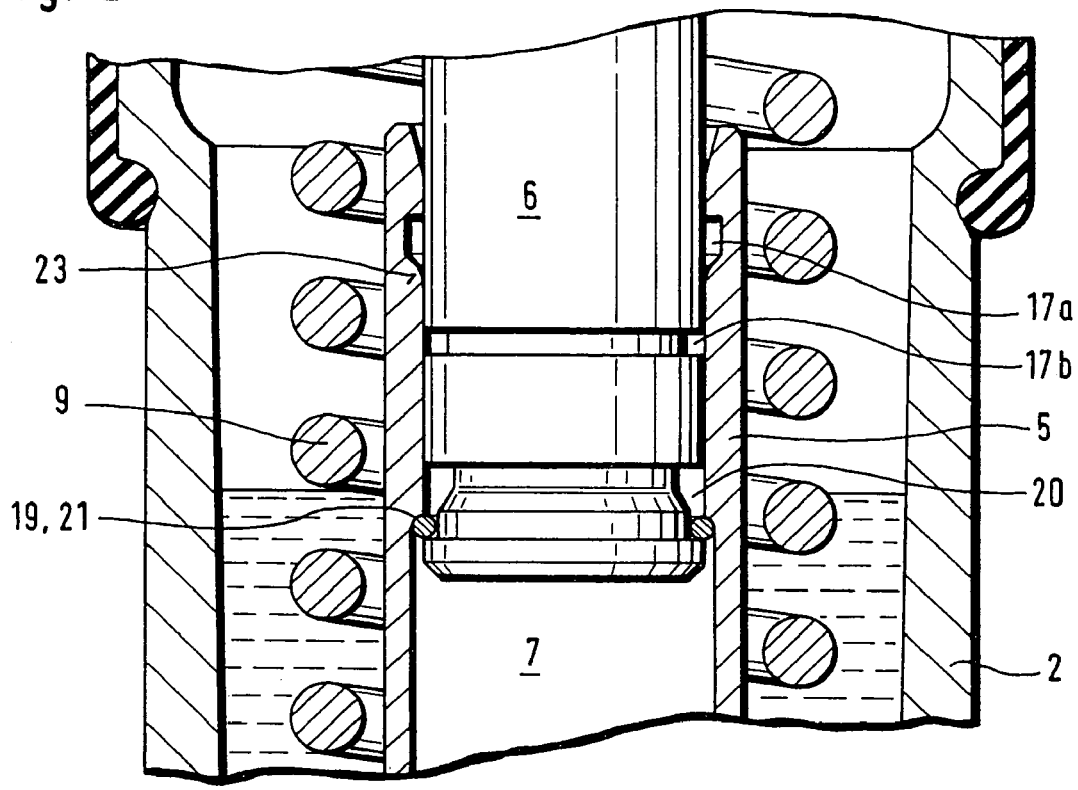
FIG. 2 is an enlarged detailed sectional view of a second embodiment of a tensioner according to the present invention.

Turning now to FIG. 2, there is shown an enlarged detailed sectional view of a second embodiment of a tensioner 1 according to the present invention. Parts corresponding with those in FIG. 1 are denoted by identical reference numerals and not explained again. The description below will center on the differences between the embodiments. In this embodiment, provision is made for a further reservoir 17b in the form of a circumferential groove in the piston 6 for hydraulic fluid. The provision of two reservoirs 17a, 17b increases the amount of hydraulic fluid in the leakage gap 13 to prevent a complete drainage, when hydraulic fluid is drawn by the underpressure into the pressure chamber 7. The reservoir 17a is configured with a slanted boundary surface which terminates in a rounded transition zone 23 to prevent the snap ring 19 from permanently snapping into the reservoir 17a, when the piston 6 is pushed into the cylinder 5.

Figure 3:
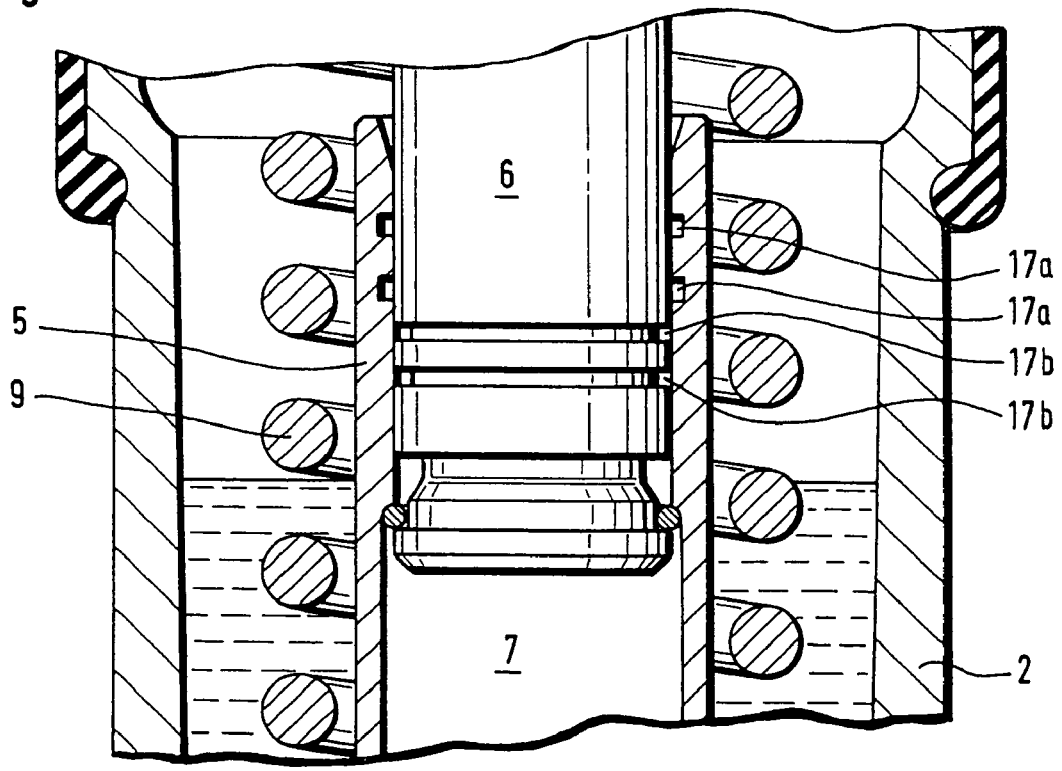
FIG. 3 is an enlarged detailed sectional view of a third embodiment of a tensioner according to the present invention.

A variation of the tensioner 1 is shown in FIG. 3 in which the reservoir is comprised of two smaller reservoir spaces 17a formed in the inside wall 15 of the cylinder 5 in parallel axially spaced-apart relationship, and two smaller reservoir spaces 17b formed in the outer surface area 14 of the piston 6 in parallel axially spaced-apart relationship. The entire volume of the reservoir (reservoir spaces 17a, 17b) provide an even greater volume of hydraulic fluid that can be drawn into the pressure chamber 7, without adversely affecting the integrity or strength of the involved parts such as cylinder 5 or piston 6.

Figure 4:
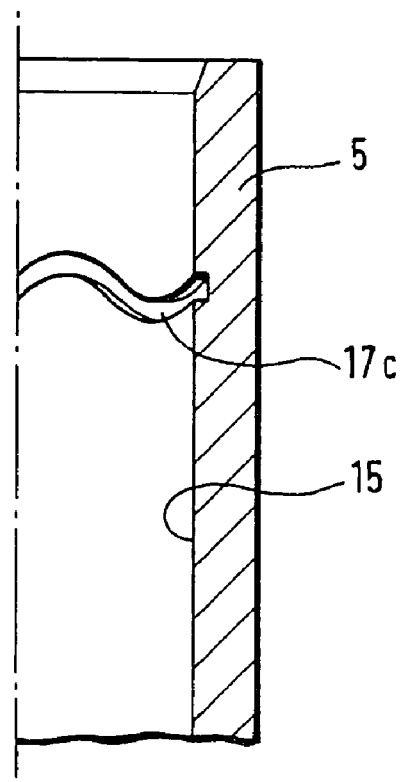
FIG. 4 is a half-sectional detailed view, on an enlarged scale, of a fourth embodiment of a tensioner according to the present invention.
Figure 5:
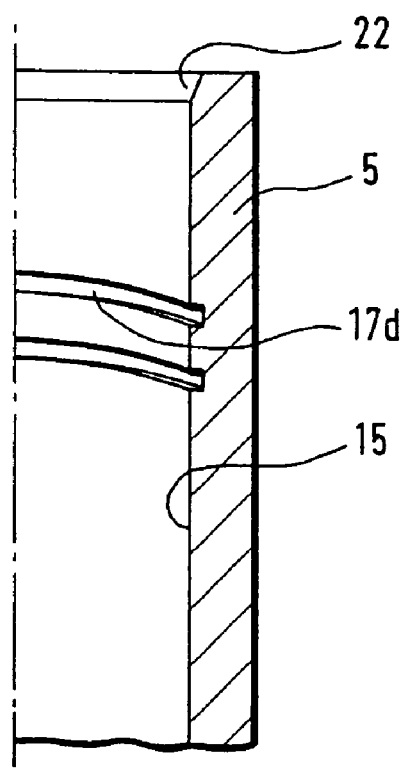
FIG. 5 is a half-sectional detailed view, on an enlarged scale, of a fifth embodiment of a tensioner according to the present invention.

FIG. 4 shows a half-sectional detailed view, on an enlarged scale, of another embodiment of a tensioner 1 according to the invention. Parts corresponding with those in FIG. 1 are denoted by identical reference numerals and not explained again. The description below will center on the differences between the embodiments. In this embodiment, the cylinder 5 has a reservoir 17c in the form of a circumferential wavy groove in the inside wall 15 of the cylinder 5. The wavy configuration of the reservoir 17c prevents a locking of the snap ring 19, when the piston 6 is pushed into the cylinder 5. An alternative construction is shown in FIG. 5, in which a reservoir 17d in the form of a circumferential helical groove is formed in the inside wall 15 of the cylinder 5. The tensioner 1 of FIG. 5 is shown here by way of example with two helical reservoirs 17d in axial spaced-apart relationship.

Figure 6:
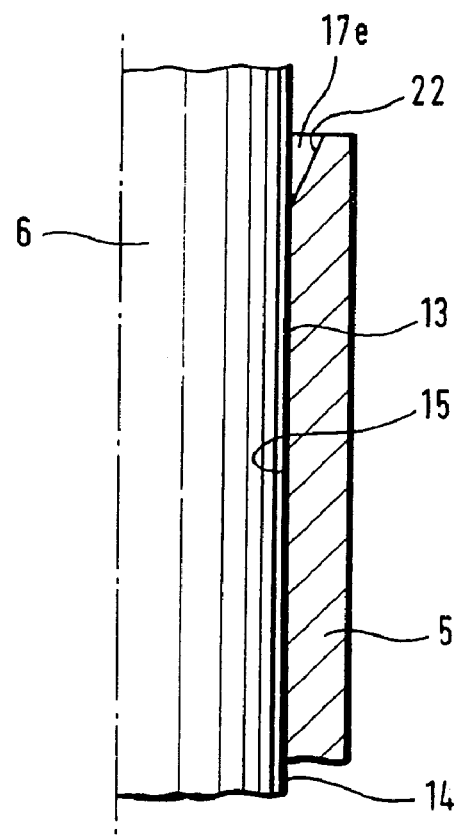
FIG. 6 is a half-sectional detailed view, on an enlarged scale, of a sixth embodiment of a tensioner according to the present invention.

Referring now to FIG. 6, there is shown a half-sectional detailed view, on an enlarged scale, of yet another embodiment of a tensioner 1 according to the present invention. In this embodiment, the slanted run-on surface 22 is enlarged not only to facilitate the insertion of the piston 6 into the cylinder 5 but also to define a reservoir 17e. The reservoir 17e can have a wedge-shaped or triangular configuration and is easy and cost-efficiently to make.

Figure 7:
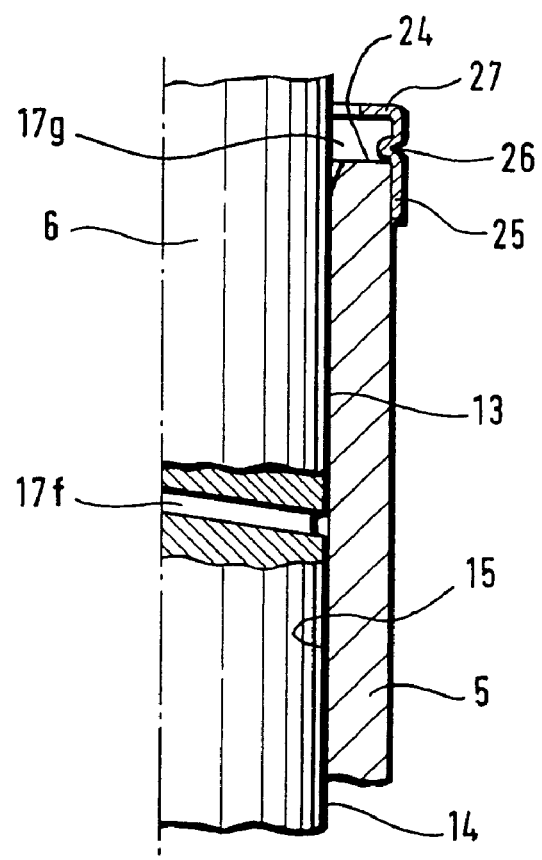
FIG. 7 is a half-sectional detailed view, on an enlarged scale, of a seventh embodiment of a tensioner according to the present invention.

FIG. 7 shows an embodiment of a tensioner 1 according to the present invention having a reservoir composed of two reservoir spaces 17f, 17g of different configuration. The reservoir space 17f is realized by a bore which is formed in the outer surface area 14 of the piston 6 and extends radially or slantingly at an inclination. Of course, the tensioner 1 of FIG. 7 may have several such bores which may be constructed as through bores or blind bores. The reservoir space 17g is realized by attaching a separate cylindrical collar 25 onto the end surface 24 of the cylinder 5 in axial prolongation of the cylinder 5 in the direction of the spring support 11 (FIG. 1). The collar 25 thus bounds radially the circular ring shaped reservoir 17g. The attachment of the collar 25 onto the cylinder 5 may be realized by a form-fitting connection or may be permanent, e.g., by means of soldering or welding to the cylinder 5. The collar 25 is formed with an embossment 26 which extends radially inwards to determine the installation position of the collar 25 once the tensioner 1 is assembled, by resting against the end surface 24 of the cylinder 5. Suitably, the collar 25 terminates in an edge 27 which is radially turned inwards.

Persons skilled in the art will understand that a tensioner 1 according to the present invention may be provided with any type of reservoirs as well as with any combination of reservoirs described herein.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A tensioner for a traction drive, comprising:
   a housing defining a longitudinal axis and having a housing wall;
   a cylinder arranged in the housing at a distance to the housing wall to thereby define an interior space in surrounding relationship to the cylinder and at least partially containing hydraulic fluid;
   a piston received in the cylinder for movement in direction of the longitudinal axis and bounding a pressure chamber containing hydraulic fluid, said piston having a cylinder-distal end which is operatively connected to a spring-biased tension roller supported on a traction member;
   a leakage gap formed between the piston and the cylinder;
   a reservoir provided in an area of the leakage gap and containing hydraulic fluid to prevent ingress of air into the pressure chamber, when the traction drive is at a rest; and
   a one-way valve disposed between the pressure chamber and the interior space, wherein hydraulic fluid is able to flow from the interior space into the pressure chamber via the one-way valve, when the piston moves in one direction, and is able to escape from the pressure chamber via the leakage gap, when the piston moves in another direction.

2. The tensioner of claim 1, wherein the cylinder includes an inside wall surface, said reservoir being constructed in the form of a circumferential groove formed in the inside wall surface of the cylinder.

3. The tensioner of claim 1, wherein the piston has an outer surface area, said reservoir being constructed in the form of at least one circumferential groove formed in the outer surface area of the piston in an area of the cylinder.

4. The tensioner of claim 1, wherein the reservoir is comprised of plural reservoir spaces, at least one reservoir space formed in the cylinder, and at least one reservoir space formed in the piston.

5. The tensioner of claim 4, wherein each of the plural reservoir spaces is configured in the form of a groove.

6. The tensioner of claim 1, wherein the reservoir is configured in the form of a wavy groove.

7. The tensioner of claim 1, wherein the reservoir is configured in the form of a helical groove formed in the cylinder or the piston.

8. The tensioner of claim 1, wherein the reservoir is realized by plural axially stepped reservoir spaces formed upon the cylinder and/or the piston.

9. The tensioner of claim 1, and further comprising a radially biased snap ring received in a groove of the piston for restricting a movement of the piston.

10. The tensioner of claim 9, wherein the cylinder is formed with an internal shoulder projecting into a movement path of the snap ring to stop the movement of the piston.

11. The tensioner of claim 2, wherein the groove has a wall which is directed toward the pressure chamber and includes a rounded transition zone.

12. The tensioner of claim 2, wherein the groove has a wall which is directed toward the pressure chamber and includes a transition zone provided with a circumferential chamfer.

13. The tensioner of claim 1, wherein the reservoir is realized by a slanted transition zone between an end surface of the cylinder and an inside wall surface of the cylinder.

14. The tensioner of claim 1, wherein the reservoir is realized by a slanted run-on surface between an end surface of the cylinder and an inside wall surface of the cylinder.

15. The tensioner of claim 14, wherein the slanted run-on surface defines a chamfer at an angle of $\geq 10°$.

16. The tensioner of claim 1, wherein the reservoir is implemented by at least one substantially radial bore in the piston.

17. The tensioner of claim 1, wherein the reservoir is implemented by at least one substantially slanted bore in the piston.

18. The tensioner of claim 1, wherein the reservoir is situated at all times in the area of the leakage gap, regardless of a position of the piston in the cylinder.

19. The tensioner of claim 1, and further comprising a separate collar attached to an end surface of the cylinder to define the reservoir in prolongation of the cylinder.

20. The tensioner of claim 19, wherein the collar is constructed for forced engagement with the cylinder.

21. The tensioner of claim 19, wherein the collar is attached to the cylinder through soldering or welding.

22. The tensioner of claim 19, wherein the collar is formed with an embossment which extends radially inwards to determine an installation position of the collar by resting against an end surface of the cylinder.

23. The tensioner of claim 19, wherein the collar is formed with a radially inwardly turned edge for abutment against an outer surface area of the piston.

24. The tensioner of claim 1, wherein the housing has a cup-shaped configuration having one stationary end which is swingably mounted.

* * * * *